US011453978B2

(12) United States Patent
Mansson et al.

(10) Patent No.: US 11,453,978 B2
(45) Date of Patent: Sep. 27, 2022

(54) PROCESS FOR SURFACE SIZING USING A JET COOKED DISPERSION COMPRISING MICROFIBRILLATED CELLULOSE, STARCH AND PIGMENT AND/OR FILLER

(71) Applicant: Stora Enso OYJ, Helsinki (FI)

(72) Inventors: Erik Mansson, Ahus (SE); Philip Hakansson, Solvesborg (SE)

(73) Assignee: Stora Enso OYJ, Helsinki (FI)

( * ) Notice: Subject to any disclaimer, the term of this patent is extended or adjusted under 35 U.S.C. 154(b) by 0 days.

(21) Appl. No.: 16/471,734

(22) PCT Filed: Dec. 19, 2017

(86) PCT No.: PCT/IB2017/058109
§ 371 (c)(1),
(2) Date: Jun. 20, 2019

(87) PCT Pub. No.: WO2018/116150
PCT Pub. Date: Jun. 28, 2018

(65) Prior Publication Data
US 2020/0024805 A1 Jan. 23, 2020

(30) Foreign Application Priority Data

Dec. 21, 2016 (SE) .................................. 1651701-3

(51) Int. Cl.
| | | |
|---|---|---|
| *D21H 21/16* | (2006.01) | |
| *D21H 19/52* | (2006.01) | |
| *D21H 19/54* | (2006.01) | |
| *C08L 1/02* | (2006.01) | |
| *C08L 3/02* | (2006.01) | |

(52) U.S. Cl.
CPC ................ *D21H 21/16* (2013.01); *C08L 1/02* (2013.01); *C08L 3/02* (2013.01); *D21H 19/52* (2013.01); *D21H 19/54* (2013.01); *C08L 2201/54* (2013.01)

(58) Field of Classification Search
CPC ........ D21H 17/28; D21H 11/18; D21H 21/16; D21H 19/54; D21H 27/10; D21H 19/385; D21H 19/52; D21H 19/40; D21H 19/38; D21H 17/675; D21H 23/22; D21H 25/06; C08L 1/02; C08L 3/02; C08L 2205/16; C08L 2201/54
See application file for complete search history.

(56) References Cited

U.S. PATENT DOCUMENTS

| | | | | |
|---|---|---|---|---|
| 4,738,726 A | * | 4/1988 | Pratt ...................... | D21H 19/62 106/487 |
| 4,767,466 A | * | 8/1988 | Nemeh .................. | D21H 17/69 106/487 |
| 5,368,690 A | | 11/1994 | Solarek et al. | |
| 6,214,163 B1 | * | 4/2001 | Matsuda ................ | D21C 9/007 162/100 |
| 8,241,756 B2 | * | 8/2012 | Ankerfors ............ | D21H 19/824 428/532 |
| 10,323,158 B2 | * | 6/2019 | Mesnager ............... | D21H 17/28 |
| 10,370,553 B2 | * | 8/2019 | Mesnager ............... | C09J 103/02 |
| 10,731,298 B2 | * | 8/2020 | Bilodeau ................ | D21H 19/54 |
| 10,837,142 B2 | * | 11/2020 | Fernandez ............. | C08B 31/02 |
| 2006/0096500 A1 | | 5/2006 | Tuason et al. | |
| 2008/0098931 A1 | * | 5/2008 | Skaggs .................. | D21H 21/30 106/206.1 |
| 2010/0078138 A1 | | 4/2010 | Laleg | |
| 2010/0224339 A1 | * | 9/2010 | Hakansson ............... | C08L 3/04 162/175 |
| 2013/0047893 A1 | * | 2/2013 | Heiskanen ................ | C08L 1/02 106/447 |
| 2014/0050922 A1 | | 2/2014 | Chin et al. | |
| 2014/0212589 A1 | * | 7/2014 | Trksak ................... | D21H 17/17 427/361 |
| 2015/0125658 A1 | * | 5/2015 | Bilodeau ................ | D21H 21/14 428/141 |
| 2015/0197892 A1 | | 7/2015 | Hirvikoski et al. | |
| 2015/0315747 A1 | * | 11/2015 | Heiskanen .............. | A47L 13/16 162/181.2 |
| 2016/0053437 A1 | * | 2/2016 | Husband ................ | D21C 9/001 162/9 |
| 2016/0060814 A1 | * | 3/2016 | Hauschel ................ | D21H 21/30 162/135 |
| 2016/0075900 A1 | * | 3/2016 | Onic ....................... | D21H 17/28 428/535 |
| 2016/0222592 A1 | * | 8/2016 | Muller ................... | D21H 17/28 |

(Continued)

FOREIGN PATENT DOCUMENTS

| | | | | | |
|---|---|---|---|---|---|
| CA | | 1140332 A | * | 2/1983 | ............. D21H 19/54 |
| CA | | 3045268 A1 | * | 6/2018 | ................ C08L 1/02 |

(Continued)

OTHER PUBLICATIONS

Machine Translation of CN103590281-A (Year: 2014).*
Machine Translation of CN101649576-A (Year: 2010).*
International Searching Authority, Written Opinion of the International Searching Authority, PCT/IB2017/058109, dated Dec. 19, 2017.
International Searching Authority, International Search Report, PCT/IB2017/058109, dated Dec. 19, 2017.
Chinga-Carrasco, G., "Cellulose fibres, nanofibrils and microfibrils: The morphological sequence of MFC components from a plant physiology and fibre technology point of view," Nanoscale Research Letters 2011, 6:417, pp. 1-7.

(Continued)

*Primary Examiner* — Jose A Fortuna
(74) *Attorney, Agent, or Firm* — Greer, Burns & Crain, Ltd.

(57) ABSTRACT

The present invention relates to a process for improved surface sizing in the manufacture of paper or board products. According to the present invention, an aqueous dispersion of microfibrillated cellulose (MFC), starch and pigments or fillers is treated by jet cooking and then used for surface sizing in a process for manufacturing a paper or board product.

15 Claims, No Drawings

(56) References Cited

U.S. PATENT DOCUMENTS

| | | | | |
|---|---|---|---|---|
| 2016/0230342 A1* | 8/2016 | Muller | | D21H 17/28 |
| 2018/0245289 A1* | 8/2018 | Heiskanen | | D21H 17/57 |
| 2018/0371694 A1* | 12/2018 | Husband | | D21D 1/20 |
| 2019/0024320 A1* | 1/2019 | Hakansson | | D21H 11/18 |
| 2019/0048527 A1* | 2/2019 | Heiskanen | | C08J 5/18 |
| 2019/0177919 A1* | 6/2019 | Husband | | D21H 17/63 |
| 2019/0248988 A1* | 8/2019 | Heiskanen | | C08K 5/0025 |
| 2019/0271115 A1* | 9/2019 | Hamers | | C12P 19/16 |
| 2019/0368121 A1* | 12/2019 | Oishi | | D21H 17/70 |
| 2020/0024805 A1* | 1/2020 | Mansson | | C08L 3/02 |
| 2020/0080264 A1* | 3/2020 | Virtanen | | D21F 11/04 |
| 2020/0140715 A1* | 5/2020 | Onic | | D21H 17/24 |
| 2020/0190740 A1* | 6/2020 | Fernandez | | D21H 17/28 |
| 2020/0263358 A1* | 8/2020 | Windebank | | D21H 19/34 |

FOREIGN PATENT DOCUMENTS

| | | | | |
|---|---|---|---|---|
| CN | 101649576 A | | 2/2010 | |
| CN | 101649582 A | | 2/2010 | |
| CN | 103590281 B | | 2/2014 | |
| CN | 110088399 A | * | 8/2019 | ............... C08L 1/02 |
| EP | 2861800 A1 | | 4/2015 | |
| JP | H06212595 A | | 8/1994 | |
| JP | H0941224 A | | 2/1997 | |
| JP | H11209401 A | | 8/1999 | |
| JP | 2014185347 A | | 10/2014 | |
| JP | 2015533954 A | | 11/2015 | |
| JP | 6734366 B2 | * | 8/2020 | ............... D21D 1/20 |
| JP | 2020502376 A | * | 1/2022 | ............... C08L 1/02 |
| JP | 7049339 B2 | * | 4/2022 | ............... C08L 1/02 |
| SE | 540387 C2 | * | 9/2018 | ............... C08L 1/02 |
| WO | 2009123560 A1 | | 10/2009 | |
| WO | WO-2009123560 A1 | * | 10/2009 | ............... B41M 5/52 |
| WO | 2011068457 A1 | | 6/2011 | |
| WO | 2013188739 A1 | | 12/2013 | |
| WO | WO-2014202354 A1 | * | 12/2014 | ............... C08B 15/08 |
| WO | 2015110979 A1 | | 7/2015 | |
| WO | 2015179470 A1 | | 11/2015 | |
| WO | WO-2017046749 A1 | * | 3/2017 | ............... D21H 27/30 |
| WO | WO-2017046751 A | * | 3/2017 | ............... D21H 21/16 |
| WO | WO-2018116150 A1 | * | 6/2018 | ............... D21H 19/54 |

OTHER PUBLICATIONS

Fengel, D., "Ultrastructural behavior of cell wall polysaccharides," Tappi J., Mar. 1970, vol. 53, No. 3.

Miskiel, F. J., et al., "Use of high amylose corn starch to improve the increase in paper strength attained by addition of microfibrilated cellulose," Research Disclosure (1999): 1557-1557; whole document.

Supplementary European Search Report, for Application No. 17883888.4, dated Jun. 3, 2020.

* cited by examiner

PROCESS FOR SURFACE SIZING USING A JET COOKED DISPERSION COMPRISING MICROFIBRILLATED CELLULOSE, STARCH AND PIGMENT AND/OR FILLER

This application is a U.S. National Phase under 35 U.S.C. § 371 of International Application No. PCT/IB2017/058109, filed Dec. 19, 2017, which claims priority under 35 U.S.C. §§ 119 and 365 to Swedish Application No. 1651701-3, filed Dec. 21, 2016.

TECHNICAL FIELD

The present invention relates to a process for improved surface sizing in the manufacture of paper or board products. According to the present invention, an aqueous dispersion of microfibrillated cellulose (MFC), starch and pigments or fillers is treated by jet cooking and then used for surface sizing in a process for manufacturing a paper or board product.

BACKGROUND

The predominant part of all paper and paperboard that is to be used in laser printers, inkjet printers and other different printing methods such as offset printing and flexoprinting, is surface treated with a surface sizing composition in order to improve printability as well as other properties of the paper or paperboard. Surface sizing compositions mainly consists of modified starches or other hydrocolloids or surface sizing agents.

Inkjet printing puts high demands on a printing paper, since the ink must be quickly dried on the substrate and yet provide a high print quality with, e.g. a high optical print density, minimized feathering and bleeding and low strike-through. In recent years it has been found that when multivalent salts, such as calcium chloride, are added to the surface size, the applied ink will precipitate fast on the surface of the paper and give rise to a significant improvement in print quality. This is especially advantageous in inkjet printing.

One problem connected to printing of uncoated paper is dusting, i.e. the tendency of a paper surface to shed loose and weakly bonded particles, which may accumulate on the printing machinery. Said weakly bonded particles mostly comprise different forms of calcium carbonate originating from fillers, such as precipitated calcium carbonate (PCC), chalk and ground calcium carbonate (GCC), present in the base-paper.

In the art, attempts to reduce the dusting tendency of paper have been done by increasing the bonding within the paper. However, in recent years, tougher demands on keeping down production costs have increased the use of fillers in printing paper manufacturing. At higher filler contents, the bonding within the paper is weakened whereby the dusting tendency increases.

US20150125658 is directed to a release base paper wherein cellulose nanofibrils, optionally combined with starch and a starch crosslinker, is added as a coating onto a partially dried web of paper.

It has previously been suggested to use starch and MFC in surface sizing to reduce the dusting tendency, but that typically leads to problems with high viscosity and low solid content.

There is thus a need for a method that enables surface sizing using MFC and starch but avoids the disadvantages generally associated with these technologies.

SUMMARY

It is an object of the present invention to provide an improved process for surface sizing, which eliminates or alleviates at least some of the disadvantages of the prior art methods.

It has surprisingly been found that by preparing an aqueous dispersion of MFC, starch and pigment and/or filler which is treated by jet cooking and then used for surface sizing in a process for manufacturing a paper or board product, the problems with too high viscosity, in particular too high extensional viscosity of the composition used for surface sizing, can be avoided. However, the benefit of reduced dusting is still achieved.

Thus, according to a first aspect, there is provided a process for surface sizing comprising the steps of:
  a) providing an aqueous dispersion comprising microfibrillated cellulose, starch and pigment and/or filler;
  b) optionally adding oxidizing agents and/or enzymes to the dispersion of step a);
  c) jet cooking the dispersion of step a) or b); and
  d) using the product obtained after the jet cooking of step c) for surface sizing in a process for the manufacture of a paper or board product.

The amount of microfibrillated cellulose (MFC) used is 2.5 kg to 25 kg per ton dry paper or board product.

The amount of starch used is 25 kg to 50 kg per ton dry paper or board product. The starch is cationic, anionic, amphoteric or native. In one embodiment, the starch used is native. In one embodiment, the starch used is cationic starch.

The amount of pigment and/or filler used is 6 kg to 50 kg per ton dry paper or board product.

Oxidizing agents that may be added in step b) include hydrogen peroxide, sodium hypochlorite, calcium hypochlorite, ammonium persulfate, potassium persulfate, hydrogen peroxide, potassium permanganate, sodium chlorite, perborates and hypochlorous acid.

Enzymes that may be added in step b) include amylases such alpha-amylase.

The jet cooking of step c) is carried out in a conventional jet cooking equipment known in the art. The jet cooking is carried out under conventional conditions generally used in the preparation of compositions for use in surface sizing.

The surface sizing is carried out using methods known in the art.

The pigment and/or filler is typically selected from the group comprising precipitated calcium carbonate, natural ground calcium carbonate, dolomite, talc, bentonite, clay, magnesite, satin white, sepiolithe, huntite, diatomite, silicates, and mixtures thereof. Precipitated calcium carbonate, which may have vateritic, calcitic or aragonitic crystal structure, and/or natural ground calcium carbonate, which may be selected from marble, limestone and/or chalk, are especially preferred.

In one embodiment of the present invention, the filler or fillers used in accordance with the present invention is precipitated calcium carbonate (PCC), ground calcium carbonate (GCC) and/or chalk.

In one embodiment of the present invention, step d) of the process according to the present invention is carried out by providing a base paper comprising filler in an amount of at least 20 weight %, which filler comprises calcium carbonate and applying a sizing composition prepared according to steps a) to c) of the present invention to the surface of said base paper.

In one embodiment of the present invention, the microfibrillated cellulose may have a Schopper Riegler value (SR°) of more than 85 SR°, or more than 90 SR°, or more than 92 SR°. The Schopper-Riegler value can be determined through the standard method defined in EN ISO 5267-1.

DETAILED DESCRIPTION

Microfibrillated cellulose (MFC) shall in the context of the patent application mean a nano scale cellulose particle fiber or fibril with at least one dimension less than 100 nm. MFC comprises partly or totally fibrillated cellulose or lignocellulose fibers. The liberated fibrils have a diameter less than 100 nm, whereas the actual fibril diameter or particle size distribution and/or aspect ratio (length/width) depends on the source and the manufacturing methods.

The smallest fibril is called elementary fibril and has a diameter of approximately 2-4 nm (see e.g. Chinga-Carrasco, G., *Cellulose fibres, nanofibrils and microfibrils,: The morphological sequence of MFC components from a plant physiology and fibre technology point of view, Nanoscale research letters* 2011, 6:417), while it is common that the aggregated form of the elementary fibrils, also defined as microfibril (Fengel, D., *Ultrastructural behavior of cell wall polysaccharides*, Tappi J., March 1970, Vol 53, No. 3.), is the main product that is obtained when making MFC e.g. by using an extended refining process or pressure-drop disintegration process. Depending on the source and the manufacturing process, the length of the fibrils can vary from around 1 to more than 10 micrometers. A coarse MFC grade might contain a substantial fraction of fibrillated fibers, i.e. protruding fibrils from the tracheid (cellulose fiber), and with a certain amount of fibrils liberated from the tracheid (cellulose fiber).

There are different acronyms for MFC such as cellulose microfibrils, fibrillated cellulose, nanofibrillated cellulose, fibril aggregates, nanoscale cellulose fibrils, cellulose nanofibers, cellulose nanofibrils, cellulose microfibers, cellulose fibrils, microfibrillar cellulose, microfibril aggregrates and cellulose microfibril aggregates. MFC can also be characterized by various physical or physical-chemical properties such as large surface area or its ability to form a gel-like material at low solids (1-5 wt %) when dispersed in water. The cellulose fiber is preferably fibrillated to such an extent that the final specific surface area of the formed MFC is from about 1 to about 300 $m^2/g$, such as from 1 to 200 $m^2/g$ or more preferably 50-200 $m^2/g$ when determined for a freeze-dried material with the BET method.

Various methods exist to make MFC, such as single or multiple pass refining, pre-hydrolysis followed by refining or high shear disintegration or liberation of fibrils. One or several pre-treatment step is usually required in order to make MFC manufacturing both energy efficient and sustainable. The cellulose fibers of the pulp to be supplied may thus be pre-treated enzymatically or chemically, for example to reduce the quantity of hemicellulose or lignin. The cellulose fibers may be chemically modified before fibrillation, wherein the cellulose molecules contain functional groups other (or more) than found in the original cellulose. Such groups include, among others, carboxymethyl (CM), aldehyde and/or carboxyl groups (cellulose obtained by N-oxyl mediated oxydation, for example "TEMPO"), or quaternary ammonium (cationic cellulose). After being modified or oxidized in one of the above-described methods, it is easier to disintegrate the fibers into MFC or nanofibrillar size fibrils.

The nanofibrillar cellulose may contain some hemicelluloses; the amount is dependent on the plant source. Mechanical disintegration of the pre-treated fibers, e.g. hydrolysed, pre-swelled, or oxidized cellulose raw material is carried out with suitable equipment such as a refiner, grinder, homogenizer, colloider, friction grinder, ultrasound sonicator, fluidizer such as microfluidizer, macrofluidizer or fluidizer-type homogenizer. Depending on the MFC manufacturing method, the product might also contain fines, or nanocrystalline cellulose or e.g. other chemicals present in wood fibers or in papermaking process. The product might also contain various amounts of micron size fiber particles that have not been efficiently fibrillated.

MFC is produced from wood cellulose fibers, both from hardwood or softwood fibers. It can also be made from microbial sources, agricultural fibers such as wheat straw pulp, bamboo, bagasse, or other non-wood fiber sources. It is preferably made from pulp including pulp from virgin fiber, e.g. mechanical, chemical and/or thermomechanical pulps. It can also be made from broke or recycled paper.

The above described definition of MFC includes, but is not limited to, the new proposed TAPPI standard W13021 on cellulose nanofibril (CMF) defining a cellulose nanofiber material containing multiple elementary fibrils with both crystalline and amorphous regions.

The dispersion prepared in step a) of the present invention may also comprise other process or functional additives, such as wet strength chemicals, retention chemicals, cross-linkers, softeners or plasticizers, adhesion primers, wetting agents, biocides, optical dyes, fluorescent whitening agents, de-foaming chemicals, hydrophobizing chemicals such as AKD, ASA, waxes, resins etc, salts such as sodium chloride, calcium chloride and other salts of divalent and polyvalent metal ions.

In one embodiment of the present invention, the pigment and/or filler is initially added to a dispersion comprising the MFC. The dispersion thus obtained is then used in the preparation of a slurry further comprising the starch. After dissolution of the starch, the aqueous dispersion of step a) is obtained.

In view of the above detailed description of the present invention, other modifications and variations will become apparent to those skilled in the art. However, it should be apparent that such other modifications and variations may be effected without departing from the spirit and scope of the invention.

The invention claimed is:

1. A process for surface sizing comprising the steps of:
   a) providing an aqueous dispersion consisting essentially of microfibrillated cellulose, starch and pigment and/or filler, wherein the microfibrillated cellulose has a Schopper Riegler value(SR°) of more than 85 SR°;
   b) jet cooking the dispersion of step a); and
   using the product obtained after the jet cooking of step b) for surface sizing in a process for the manufacture of a paper or board product.

2. A process according to claim 1, wherein said filler is selected from precipitated calcium carbonate, chalk and ground calcium carbonate.

3. A process according to claim 1, wherein the amount of microfibrillated cellulose used in the process is from 2.5 kg to 25 kg per ton dry paper or board product.

4. A process according to claim 1, wherein the amount of starch used in the process is from 25 kg to 50 kg per ton dry paper or board product.

5. A process according to claim 1, wherein the amount of pigment and/or filler used in the process is from 6 kg to 50 kg per ton dry paper or board product.

6. The method of claim 1 further comprising adding oxidizing agents and/or enzymes to the dispersion between step a) and step b).

7. A process according to claim 1, wherein the amount of microfibrillated cellulose used in the process is from 2.5 kg to 25 kg per ton dry paper or board product, wherein the amount of starch used in the process is from 25 kg to 50 kg per ton dry paper or board product, and wherein the amount of pigment and/or filler used in the process is from 6 kg to 50 kg per ton dry paper or board product.

8. A process according to claim 1, wherein providing the aqueous dispersion comprises:
providing an initial aqueous dispersion comprising microfibrillated cellulose;
adding a pigment and/or a filler to the aqueous dispersion comprising microfibrillated cellulose; and
adding starch to the second aqueous dispersion comprising microfibrillated cellulose and the pigment and/or filler and dissolving the starch to form the aqueous dispersion.

9. A process according to claim 1, wherein providing the aqueous dispersion comprises:
providing an initial aqueous dispersion comprising microfibrillated cellulose;
adding a pigment and/or a filler to the second aqueous dispersion comprising microfibrillated cellulose; and
adding starch to the aqueous dispersion comprising microfibrillated cellulose and the pigment and/or filler and dissolving the starch to form the aqueous dispersion.

10. A process comprising the steps of:
a) providing an aqueous dispersion consisting essentially of microfibrillated cellulose, starch and pigment and/or filler wherein the microfibrillated cellulose has a Schopper Riegler value (SR°) of more than 85 SR°;
b) jet cooking the dispersion of step a) to providing a surface sizing coating;
c) providing a base paper comprising filler in an amount of at least 20 wt %, wherein the filler of the base paper comprises calcium carbonate; and, d) applying the surface sizing coating obtained in step b) on the base paper.

11. A process according to claim 10, wherein said filler is selected from precipitated calcium carbonate, chalk and ground calcium carbonate.

12. A process according to claim 10, wherein the amount of microfibrillated cellulose used in the process is from 2.5 kg to 25 kg per ton dry paper or board product.

13. A process according to claim 10, wherein the amount of starch used in the process is from 25 kg to 50 kg per ton dry paper or board product.

14. A process according to claim 10, wherein the amount of pigment and/or filler used in the process is from 6 kg to 50 kg per ton dry paper or board product.

15. A process according to claim 10, wherein the amount of microfibrillated cellulose used in the process is from 2.5 kg to 25 kg per ton dry paper or board product, wherein the amount of starch used in the process is from 25 kg to 50 kg per ton dry paper or board product, and wherein the amount of pigment and/or filler used in the process is from 6 kg to 50 kg per ton dry paper or board product.

* * * * *